United States Patent
Krishna et al.

(10) Patent No.: US 11,582,765 B2
(45) Date of Patent: Feb. 14, 2023

(54) DETERMINING RADIO SIGNAL METRICS FOR SPECIFIED RESOURCE BLOCKS

(71) Applicant: T-MOBILE INNOVATIONS LLC, Overland Park, KS (US)

(72) Inventors: Anirudh Krishna, Bartlett, IL (US); Sreekar Marupaduga, Overland Park, KS (US); Ravi Varma Kallepalli, Overland Park, KS (US); Maher Ahmad Hasan, Ashburn, VA (US); Vladyslav Bereslavskyy, Buffalo Grove, IL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 107 days.

(21) Appl. No.: 17/150,744

(22) Filed: Jan. 15, 2021

(65) Prior Publication Data
US 2022/0232572 A1 Jul. 21, 2022

(51) Int. Cl.
| | |
|---|---|
| *H04W 72/08* | (2009.01) |
| *H04W 72/04* | (2009.01) |
| *H04W 72/12* | (2009.01) |
| *H04W 24/10* | (2009.01) |
| *H04B 17/318* | (2015.01) |
| *H04B 17/336* | (2015.01) |

(Continued)

(52) U.S. Cl.
CPC ........ *H04W 72/085* (2013.01); *H04B 17/318* (2015.01); *H04B 17/336* (2015.01); *H04W 24/10* (2013.01); *H04W 72/042* (2013.01); *H04W 72/0453* (2013.01); *H04W 72/1231* (2013.01); *H04W 76/11* (2018.02); *H04W 76/27* (2018.02)

(58) Field of Classification Search
CPC ............. H04W 72/085; H04W 72/042; H04W 72/0453; H04W 72/1231; H04W 72/04; H04W 76/11; H04W 76/27; H04W 24/10; H04W 24/08; H04W 24/06; H04B 17/318; H04B 17/336
USPC .................................................. 370/329–330
See application file for complete search history.

(56) References Cited

U.S. PATENT DOCUMENTS

| 8,285,295 B2 | 10/2012 | Westerberg et al. |
| 9,867,194 B2 | 1/2018 | Kadous et al. |

(Continued)

FOREIGN PATENT DOCUMENTS

JP 6236551 B2 8/2017

*Primary Examiner* — Candal Elpenord

(57) ABSTRACT

A Radio Access Network (RAN) wirelessly serves a User Equipment (UE) over a frequency channel based on a radio signal metric. The RAN comprises baseband circuitry and a radio. The baseband circuitry determines when multiple Physical Cell Identifiers (PCIs) are available to serve the UE. In response, the baseband circuitry selects some resource blocks in the frequency channel and generates a UE instruction to measure the radio signal metric for the selected resource blocks. The radio receives the UE instruction for the baseband circuitry and wirelessly transfers the UE instruction to the UE. The radio wirelessly receives a measurement report from the UE that indicates the radio signal metric for the selected resource blocks. The radio transfers the measurement report to the baseband circuitry. The baseband circuitry receives the measurement report and responsively schedules the UE in the selected resource blocks based on the radio signal metric.

20 Claims, 9 Drawing Sheets

(51) Int. Cl.
*H04W 76/11* (2018.01)
*H04W 76/27* (2018.01)
*H04W 72/0453* (2023.01)

(56) References Cited

U.S. PATENT DOCUMENTS

| | | | |
|---|---|---|---|
| 10,362,574 | B2 | 7/2019 | Chendamarai Kannan et al. |
| 10,582,409 | B2 | 3/2020 | Vajapeyam et al. |
| 2015/0043499 | A1* | 2/2015 | Yue ................ H04L 1/0077 370/329 |
| 2015/0327287 | A1* | 11/2015 | Kim ................ H04B 7/024 370/329 |
| 2017/0006492 | A1* | 1/2017 | Khoshnevisan ..... H04J 11/0053 |
| 2018/0220422 | A1* | 8/2018 | Bhattad ................ H04L 1/00 |
| 2018/0295633 | A1 | 10/2018 | Abdelmonem |
| 2019/0124519 | A1 | 4/2019 | Takiguchi et al. |
| 2019/0230549 | A1 | 7/2019 | Wang et al. |
| 2019/0281487 | A1* | 9/2019 | Liu ................ H04L 5/0048 |
| 2020/0120649 | A1 | 4/2020 | Nimbalker et al. |
| 2020/0187034 | A1 | 6/2020 | Kuang et al. |

* cited by examiner

DETERMINING RADIO SIGNAL METRICS FOR SPECIFIED RESOURCE BLOCKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. Exemplary network functions include Access and Mobility Management Functions (AMFs), Session Management Functions (SMFs), and User Plane Functions (UPFs).

The wireless access nodes exchange wireless signals with the wireless user devices over radio frequency bands that comprise frequency channels. The frequency channels comprise an amount of resource blocks. The wireless access nodes use the resource blocks in the frequency channels to exchange the wireless signals with the wireless user devices. With the advent of 5GNR, the size of the frequency channels has increased. The larger frequency channels comprise a greater amount of resource blocks to facilitate wireless communications with a greater amount of wireless user devices. The wireless access nodes are faced with the problem of determining radio signal metrics for the frequency channels given the increase in channel size. The larger frequency channels have higher signal variance which decreases the accuracy of the radio signal metrics. Unfortunately, the wireless access nodes do not efficiently and effectively determine the radio signal metrics for the frequency channels given this increase in channel size.

Technical Overview

A Radio Access Network (RAN) wirelessly serves a User Equipment (UE) over a frequency channel based on a radio signal metric. The RAN comprises baseband circuitry and a radio. The baseband circuitry determines when multiple Physical Cell Identifiers (PCIs) are available to serve the UE. In response, the baseband circuitry selects some resource blocks in the frequency channel and generates a UE instruction to measure the radio signal metric for the selected resource blocks in the frequency channel and to avoid measuring the radio signal metric for other resource blocks in the frequency channel. The radio receives the UE instruction from the baseband circuitry. The radio wirelessly transfers the UE instruction to the UE. The radio wirelessly receives a measurement report from the UE that indicates the radio signal metric for the selected resource blocks. The radio transfers the measurement report to the baseband circuitry. The baseband circuitry receives the measurement report and responsively schedules the UE in the selected resource blocks based on the radio signal metric for the selected resource blocks.

DETAILED DESCRIPTION

Figure 1:
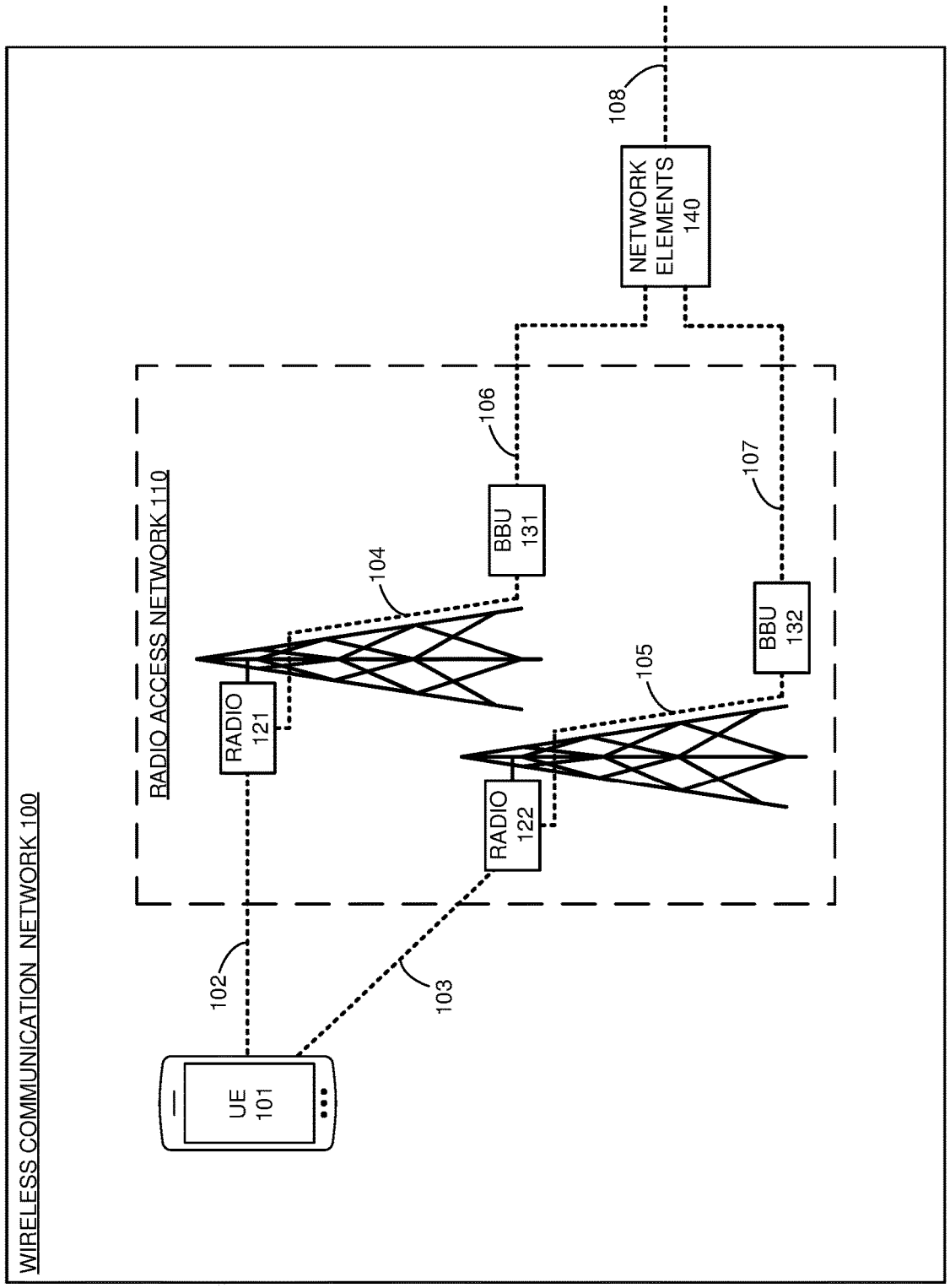
FIG. 1 illustrates a wireless communication network that serves a wireless User Equipment (UE) that determines a radio metric for selected resource blocks.

FIG. 1 illustrates wireless communication network 100. Wireless communication network 100 provides wireless data services to UEs 101 like machine-control, internet-access, media-streaming, social-networking, and/or some other type of wireless networking product. Wireless communication network 100 comprises wireless UE 101, links 102-108, Radio Access Network (RAN) 110, and network elements 140. RAN 110 comprises radios 121-122 and Baseband Units (BBUs) 131-132. RAN 110 serves UE 110 on a frequency channel. The frequency channels comprise an amount of resource blocks.

Various examples of network operation and configuration are described herein. In some examples, BBU 131 determines when multiple Physical Cell Identifiers (PCIs) that can serve UE 101. In response, BBU 131 selects some resource blocks in the frequency channel. BBU 131 generates a UE instruction for UE 101 directs UE 101 to measure a radio signal metric for the selected resource blocks in the frequency channel. The UE instruction directs UE 101 to inhibit measuring the radio signal metric for other resource blocks in the frequency channel. For example, BBU 131 may select a frequency range in the frequency channel that comprises the selected resource blocks and generate a UE instruction that directs UE 101 to measure the signal metric only over the selected frequency range. Radio 121 receives the UE instruction from BBU 131. Radio 121 wirelessly transfers the UE instruction to UE 101. Radio 121 wirelessly receives a measurement report from UE 101 that indicates the radio signal metric for the selected resource blocks. Radio 121 transfers the measurement report to BBU 131. BBU 131 receives the measurement report. In response, BBU 131 schedules UE 101 in the selected resource blocks based on the radio signal metric for the selected resource blocks. Advantageously, RAN 110 effectively and efficiently determines radio signal metrics for selected resource blocks in the frequency channel. Moreover, RAN 110 mitigates the variance exhibited in large frequency channels by restricting the resource blocks on which the radio signal metric is measured.

UE 101 and RAN 101 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. RAN 110 and network elements 140 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a smartphone, vehicle, sensor, robot, computer, or some other data appliance with wireless communication circuitry. RAN 110 is depicted as towers but RAN 110 may use other mounting structures or no mounting structure at all. RAN 110 may comprise gNodeBs, eNodeBs, NB-IoT access nodes, LP-WAN base stations, wireless relays, and/or some other wireless network transceivers. UE 101 and radios 121-122 comprise antennas, amplifiers, filters, modulation, analog/digital interfaces, and microprocessors. UE 101, BBUs 131-132, and network elements 140 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of RAN 110 as described herein. In some examples, network elements 140 comprise User Plane Functions (UPFs), Gateways (GWs), and/or other network elements that are hosted by a Network Function Virtualization Infrastructure (NFVI).

Figure 2:
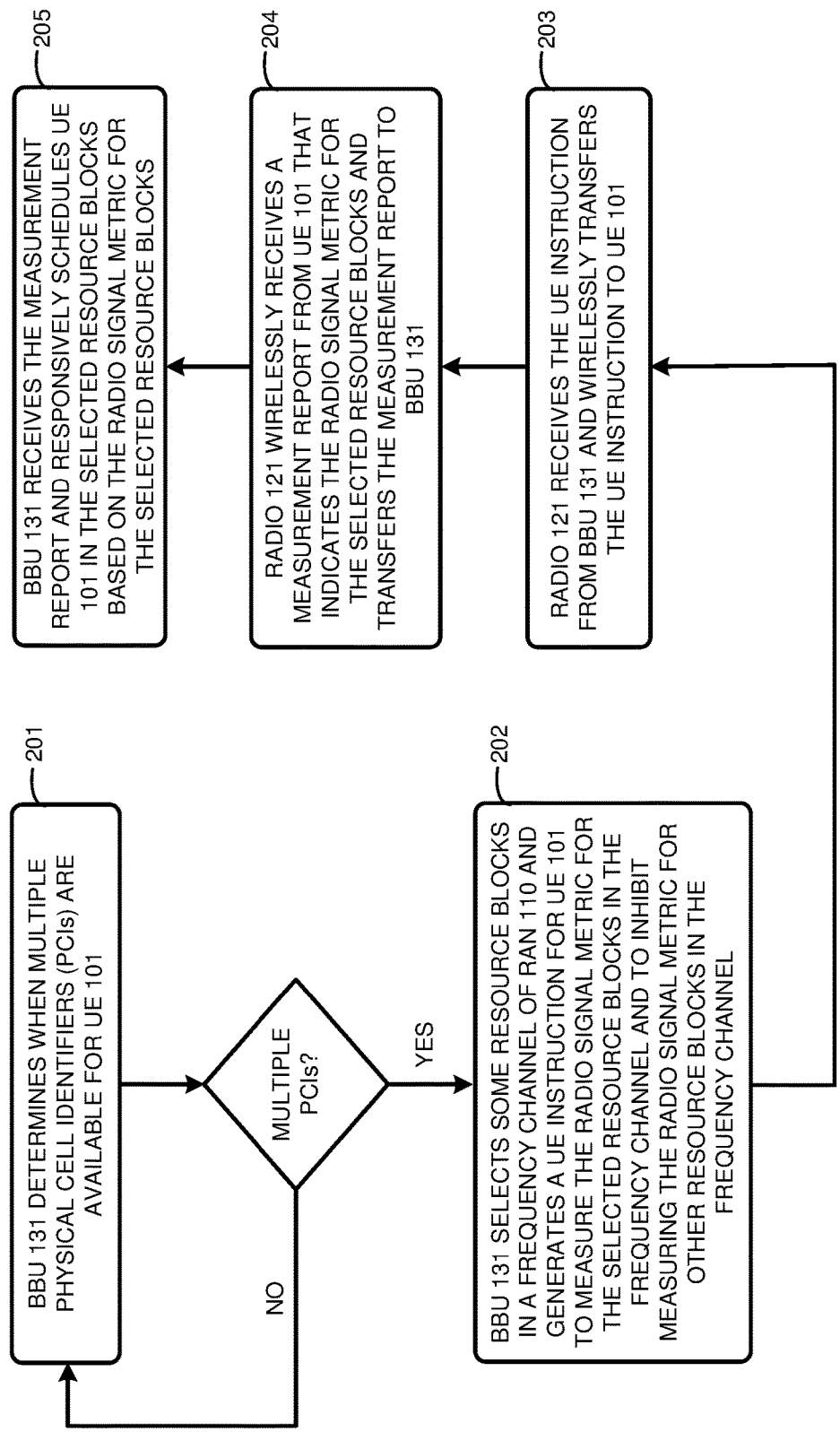
FIG. 2 illustrates the operation of the wireless communication network and the wireless UE to determine a radio metric for selected resource blocks.

FIG. 2 illustrates the operation of RAN 110 and wireless UE 101 to determine a radio metric for selected resource blocks. The operation is exemplary and may vary in other examples. BBU 131 determines when multiple physical cell identifiers (PCIs) are available for UE 101 (201). For example, BBU 131 may determine that UE 101 can attach to RAN 110 over radio 121 and radio 122. If BBU 131 determines that there are not multiple PCIs available for UE 101, then BBU 131 continues to monitor for when multiple PCIs become available for UE 101. When BBU 131 determines that multiple PCIs are available for UE 101, BBU 131 selects some resource blocks in a frequency channel of RAN 110 and generates a UE instruction for UE 101 (202). The UE instruction directs UE 101 to measure a radio signal metric for the selected resource blocks in the frequency channel and to inhibit measuring the radio signal metric for other resource blocks in the frequency channel (202). Radio 121 receives the UE instruction from BBU 131 and wirelessly transfers the UE instruction to UE 101 (203). Radio 121 wirelessly receives a measurement report from UE 101 that indicates the radio signal metric for the selected resource blocks and transfers the measurement report to BBU 131 (204). BBU 131 receives the measurement report and responsively schedules UE 101 in the selected resource blocks based on the radio signal metric for the selected resource blocks (205).

Figure 3:
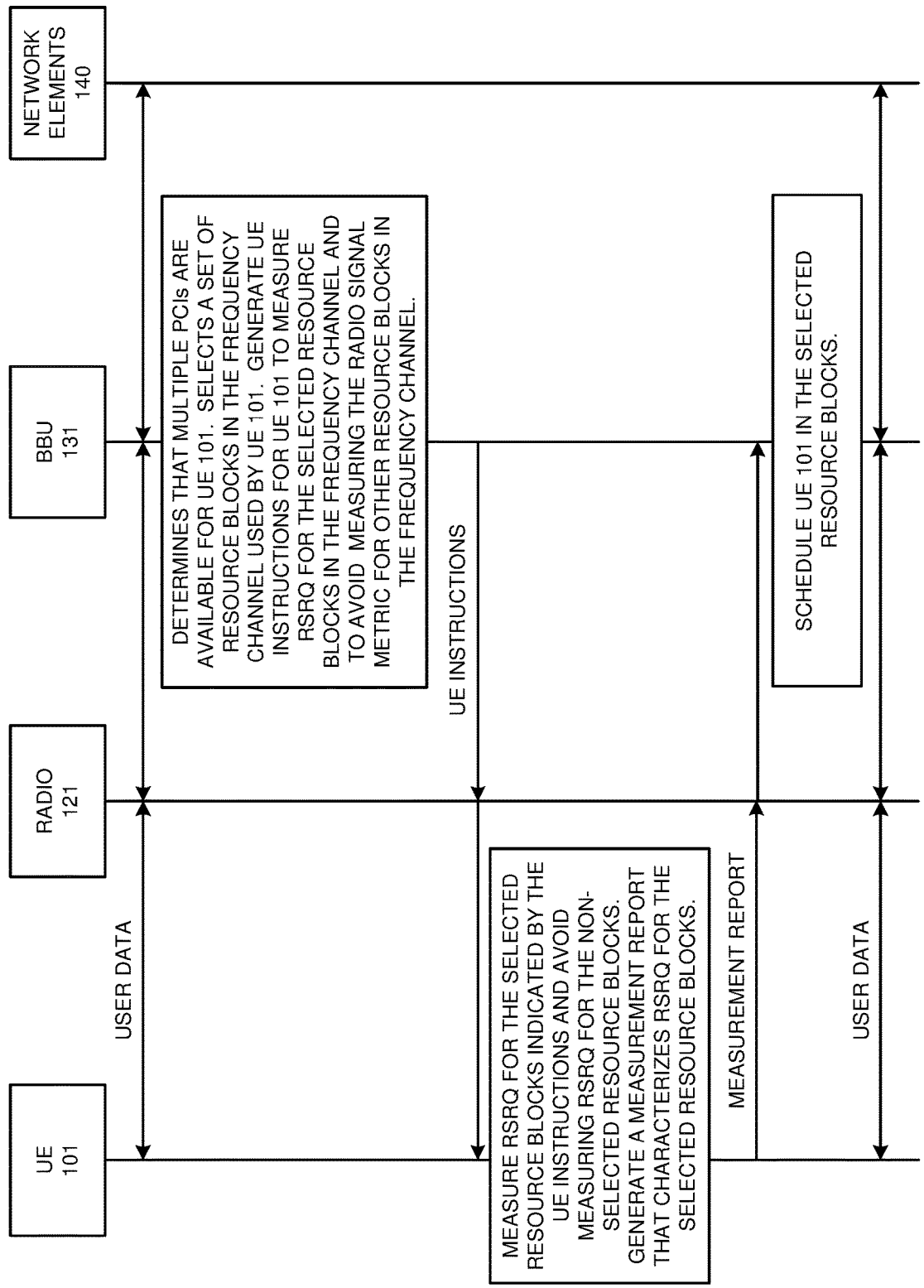
FIG. 3 illustrates the operation of the wireless communication network and the wireless UE to determine a radio metric for selected resource blocks.

FIG. 3 illustrates the operation of RAN 110 and wireless UE 101 to determine a radio signal metric for selected resource blocks. The operation is exemplary and may vary in other examples. In this example, BBU 131 serves UE 101 over a frequency channel and directs UE 101 to measure Reference Signal Received Quality (RSRQ) for selected resource blocks in the frequency channel, although other radio metrics may be measured in other examples.

In operation, UE 101 executes a user application and exchanges user data with network elements 140 on a frequency channel over radio 121 and BBU 131. BBU 131 determines that multiple PCIs are available for UE 101. BBU 131 selects a set of resource blocks in the frequency channel for measurement. BBU 131 generates UE instructions that direct UE 101 to measure RSRQ for the selected set of resource blocks and to avoid measuring resource blocks that are not selected. For example, BBU 131 may select a frequency range that comprises the selected resource blocks and transfer UE instructions to UE 101 that direct UE 101 to measure RSRQ over the specified frequency range.

BBU 131 transfers the UE instructions to radio 121. Radio 121 wirelessly transfers the UE instructions to UE 101. UE 101 receives the UE instructions. UE 101 measures RSRQ for the selected resource blocks and does not measure RSRQ for the other resource blocks in the frequency channel. For example, the UE instructions may specify a frequency range that comprises the selected resource blocks within the frequency channel and UE 101 may responsively measure RSRQ over the specified frequency range. UE 101 generates a measurement report that characterizes the RSRQ for the selected resource blocks in the frequency channel and avoids characterizing the RSRQ for the non-selected resource blocks.

UE 101 wirelessly transfers the measurement report to radio 121. Radio 121 transfers the measurement report to BBU 131. BBU 131 receives the measurement report and responsively schedules UE 101 in the selected resource blocks. For example, BBU 131 may determine that the RSRQ for the selected resource blocks is above a quality threshold and responsively schedule UE 101 in the selected resource blocks. UE 101 exchanges user data with network elements 140 using the scheduled resource blocks. Although BBU 131 used RSRQ to schedule UE 101 in this example, other radio signal metrics may be used in other examples. Exemplary radio signal metrics include Synchronization Signal RSRQ (SS-RSRQ), Channel State Information RSRQ (CSI-RSRQ), Received Signal Received Power (RSRP), Received Signal Strength Indication (RSSI), and/or Signal to Interference plus Noise Ratio (SINR).

In some examples, BBU 131 utilizes other triggering events to determine when to generate the UE instructions for UE 101. The other triggering events may include channel bandwidth, channel load, or some other channel condition. For example, BBU 131 may determine that the bandwidth of the frequency channel exceeds a threshold value, and that multiple PCIs are available to determine to generate the UE instructions. For example, BBU 131 may determine the amount of RRC connected UEs on the frequency channel exceeds a threshold value and that multiple PCIs are available to determine to generate the UE instructions. For example, BBU 131 may determine the fraction of occupied resource blocks exceeds a threshold value and that multiple PCIs are available to determine to generate the UE instructions.

Figure 4:
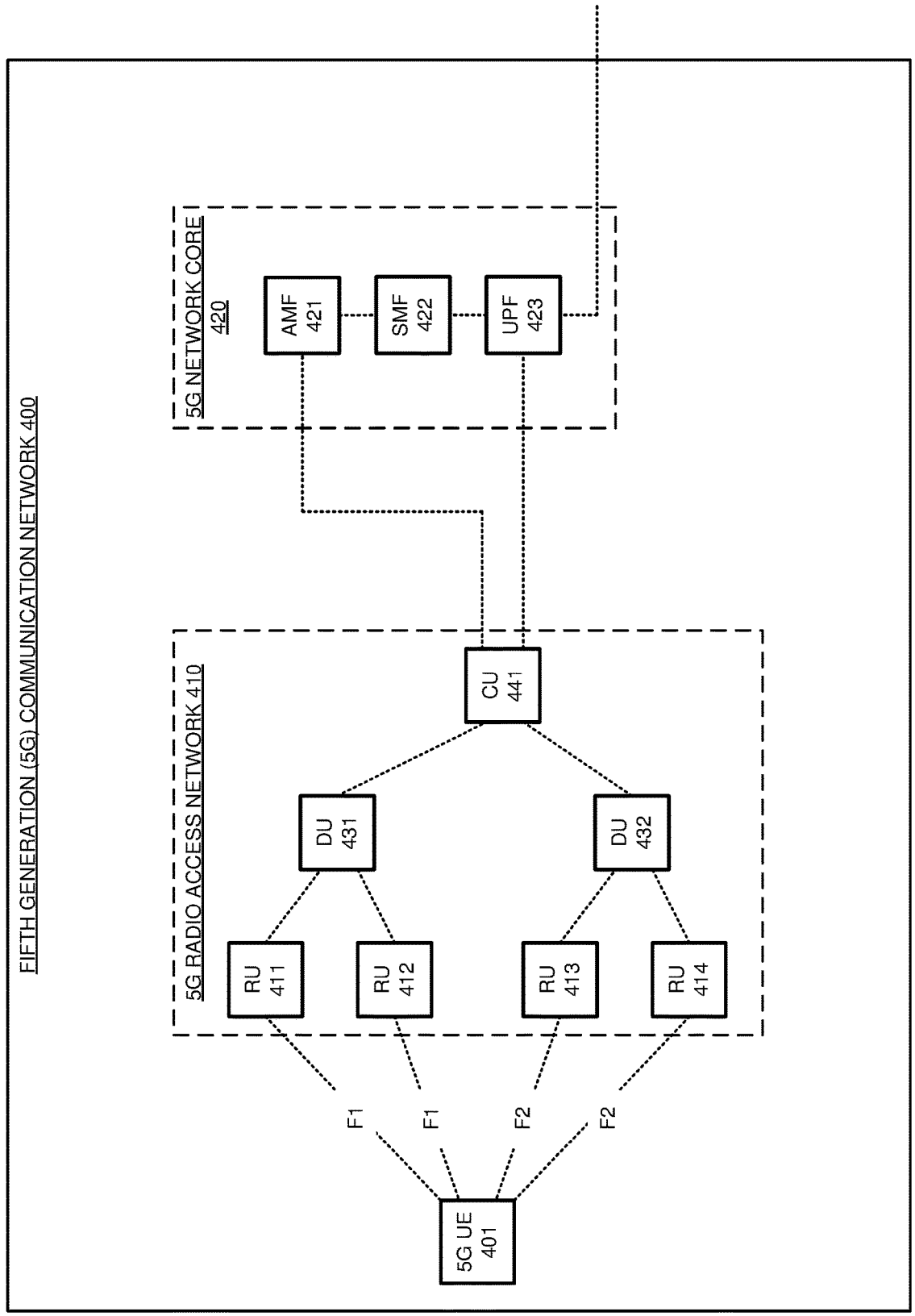
FIG. 4 illustrates a Fifth Generation (5G) communication network that serves a 5G User Equipment (UE) and determines a radio metric for selected resource blocks.

FIG. 4 illustrates Fifth Generation (5G) communication network 400 that serves 5G User Equipment (UE) 401 to determine radio metrics for selected resource blocks. 5G communication network 400 comprises an example of wireless communication network 100, although network 100 may differ. 5G communication network 400 comprises 5G UE 401, 5G Radio Access Network (RAN) 410, and 5G network core 420. 5G RAN 410 comprises Radio Units (RUs) 411-414, Distributed Units 431-432, and Centralized Unit (CU) 441. 5G network core comprises Access and Mobility Management Function (AMF) 421, Session Management Function (SMF) 422, and User Plane Function (UPF) 423. Other network functions are typically present but are omitted for clarity. RUs 411-412 use a first frequency band (F1) that has frequency channels that are a few hundred megahertz wide. RUs 413-414 use a second frequency band (F2) that has frequency channels that are a 1000 megahertz wide.

UE 401 measures signal strength for RUs 411-414. UE 401 wirelessly attaches to RU 411 based on signal strength and exchanges attachment signaling with CU 441 over RU 411 and DU 431. The attachment signaling indicates PCIs detected by UE 401 the signal strength for each PCI. CU 441 request wireless data service for UE 401 from AMF 421. AMF 421 interacts other network functions to authorize UE 401 for wireless data services. Responsive to the authorization, AMF 421 transfers network addresses and quality-of-service metrics for UE 401 to CU 441. CU 441 transfers the network addressing and quality of-service-metrics to UE 401 over DU 431 and RU 411. CU 441 controls DU 431 and RU 411 to serve UE 401 over a frequency channel in F1. UE 401 exchanges user signaling with AMF 421 and user data with UPF 423 and SMF 422 over RU 411, DU 431, and CU 441.

CU 441 hosts a data structure and determines that multiple PCIs are available for UE 401 based on the attachment signaling. CU 441 selects a set of resource blocks in the frequency channel and generates measurement instructions for UE 401. CU 441 may select the set of resource blocks based on RF channel conditions, UE capabilities of UE 401, channel maintenance, or some other RF factor. The measurement instructions direct UE 411 to measure RSRQ for a frequency range that comprises the selected resource blocks and to avoid measuring signal metrics for resource blocks outside of the frequency range. The frequency range is defined by a measurement start frequency and a measurement stop frequency. CU 441 transfers the UE instructions to DU 431. DU 431 transfers the measurement instructions to UE 401 over RU 411.

UE 401 receives the UE instructions from RU 411. UE 401 measures RSSI and RSRP over the frequency range indicated by the UE instructions. UE 401 determines RSRQ based on the measured RSSI and RSRP. UE 401 generates a measurement report that indicates the RSRQ for the frequency range. UE 401 transfers the measurement report to RU 411. RU 411 transfers the measurement report to DU 431. DU 431 transfers the measurement report to CU 441. CU 441 determines the RSRQ for the selected resource blocks is above a quality threshold. CU 441 verifies that UE 401 measured RSRQ only over the specified frequency range. CU 441 directs DU 431 to schedule UE 401 in the selected resource blocks. DU 431 schedules UE 401 in the selected resource blocks. DU 431 notifies UE 401 over RU 411 of the scheduling. UE 401 exchanges user signaling and user data with CU 441 over RU 411 and DU 431 using the scheduled resource blocks. CU 441 exchanges the user signaling with AMF 421. CU 441 exchanges the user data with UPF 423 and SMF 422.

Due to UE mobility or some other triggering event, UE 401 hands over to RU 414. CU 441 controls DU 432 and RU 414 to serve UE 401 over a frequency channel in F2. UE 401 exchanges user data with UPF 423 and user signaling with AMF 421 over RU 414, DU 432, and CU 441. CU 441 implements a data structure and determines that multiple PCIs are available for UE 401 based on the attachment signaling of UE 401. In some examples, the multiple available PCIs indicates three or more PCIs, or some other PCI threshold value. CU 441 implements a data structure and determines that the serving frequency channel exceeds a bandwidth threshold. For example, CU 441 may determine a bandwidth threshold of 40 megahertz and that the serving frequency channel is larger than 40 megahertz. In other example, other threshold values could be used. In response to the multiple available PCIs and the excessive bandwidth, CU 441 selects a set of resource blocks in the new frequency channel and generates measurement instructions for UE 401. The measurement instructions direct UE 401 to measure SINR for a frequency range that comprises the selected resource blocks and to avoid measuring signal metrics for resource blocks outside of the frequency range. CU 441 transfers the UE instructions to DU 432. DU 432 transfers the measurement instructions to UE 401 over RU 414.

UE 401 receives the UE instructions from RU 414. UE 401 measures the SINR over the frequency range indicated by the UE instructions. UE 401 generates a measurement report that indicates the SINR for the frequency range and transfers the measurement report to RU 414. RU 414 transfers the measurement report to DU 432. DU 432 transfers the measurement report to CU 441. CU 441 determines the SINR for the selected resource blocks is above a quality threshold. CU 441 directs DU 432 to schedule UE 401 in the selected resource blocks. DU 432 schedules UE 401 in the selected resource blocks. DU 432 notifies UE 401 over RU 414 of the scheduling. UE 401 exchanges user signaling and user data with CU 441 over RU 414 and DU 432 in the scheduled resource blocks. CU 441 exchanges the user signaling with AMF 421. CU 441 exchanges the user data with UPF 423 and SMF 422.

Figure 5:
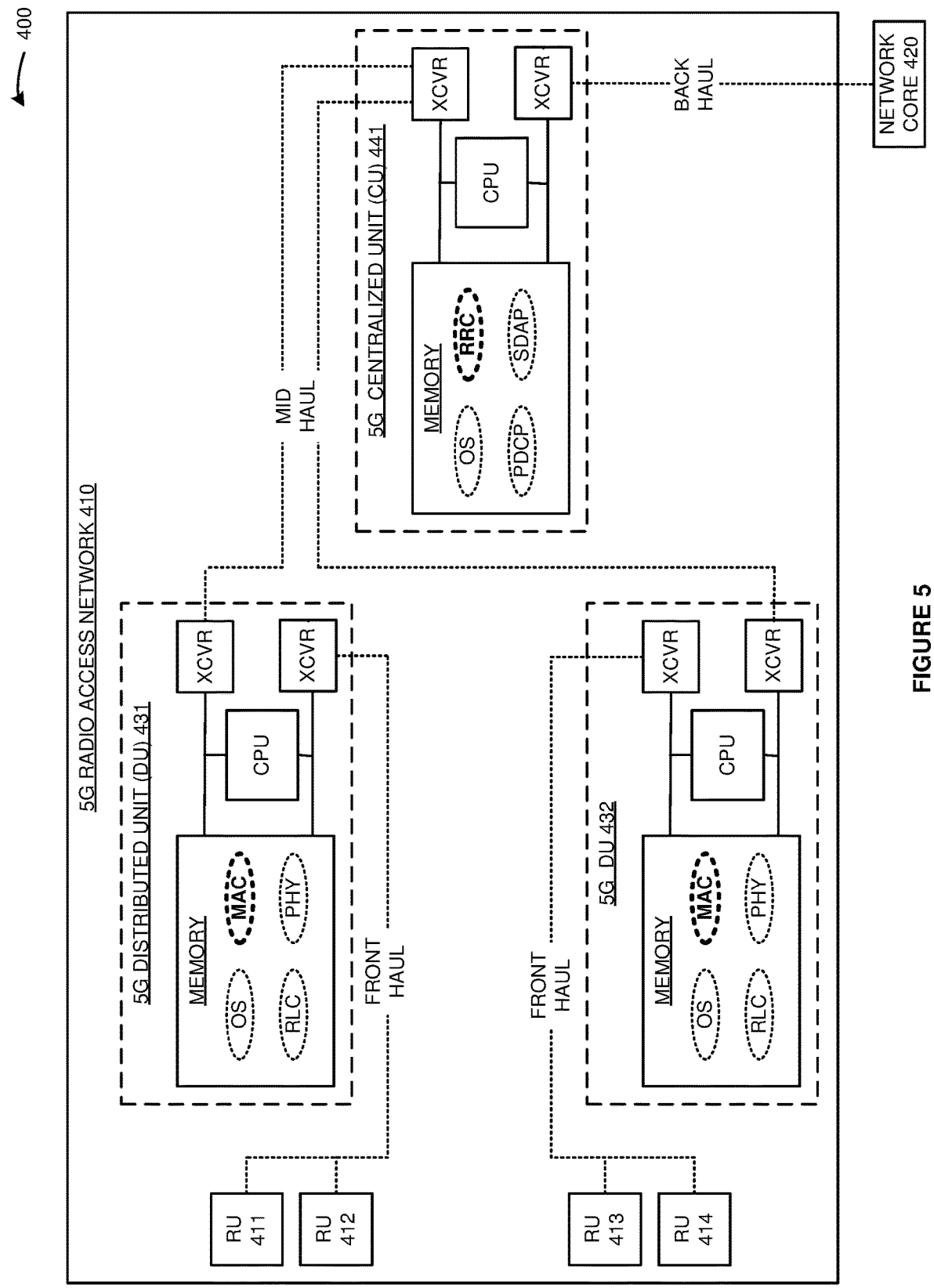
FIG. 5 illustrates 5G Distributed Units (DUs) and a 5G Centralized Unit (CU) that serve the 5G UE and determine a radio metric for selected resource blocks.

FIG. 5 illustrates 5G Distributed Units (DUs) 431-432 and 5G Centralized Unit (CU) 441 that serve 5G UE 401 to determine radio metrics for selected resource blocks. DUs 431-432 and CU 441 comprise an example of BBUs 131-132, although BBUs 131-132 may differ. DUs 431-432 comprise memory, CPU, and transceivers that are coupled over bus circuitry. The memories in DUs 431-432 store operating systems and 5GNR network applications like Physical Layer (PHY), Media Access Control (MAC), and Radio Link Control (RLC). CU 441 comprises memory, CPU, and transceivers that are coupled over bus circuitry. The memory in CU 441 stores an operating system and network applications like Packet Data Convergence Protocol (PDCP), Service Data Adaptation Protocol (SDAP), and Radio Resource Control (RRC). Transceivers in DUs 431-432 are coupled to transceivers in RUs 411-414 over fronthaul links. Transceivers in DUs 431-432 are coupled to transceivers in CU 441 over mid-haul links. Transceivers in CU 441 are coupled to network core 420 over backhaul links.

RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). PDCP functions include security ciphering, header compression and decompression, sequence numbering and re-sequencing, de-duplication, SDAP functions include QoS marking and flow control. RRC functions include authentication, security, handover control, status reporting, QoS, network broadcasts and pages, and network selection.

UE 401 wirelessly attaches to the RRC in CU 441 on F1 based on the signal strength. The RRC controls DU 431 and RU 411 to serve UE 401 over a frequency channel in F1. The hosts a data structure to determine that multiple PCIs are available for UE 401 based on the attachment signaling. Typically, UE 401 transfers a measurement report during the attachment process that indicates the PCIs available to UE 401. The RRC in CU 441 selects a set of resource blocks in the frequency channel and generates measurement instructions for UE 401. The measurement instructions direct UE 411 to measure RSRQ (or some other radio signal metric) for a frequency range that comprises the selected resource blocks and to avoid measuring signal metrics for resource blocks outside of the frequency range. The RRC transfers the UE instructions to UE 401 over DU 431 and RU 411.

RU 411 receives a measurement report from UE 401 that indicates the RSRQ for the selected resource blocks. RU 411 transfers the measurement report to the RRC in CU 441 over DU 431. The RRC verifies that UE 401 measured RSRQ for only the specified resource blocks and determines the RSRQ for the selected resource blocks is above a quality threshold. When the RRC cannot verify the measured RSRQ, the RRC regenerates the UE instructions and transfers the new UE instructions to UE 401. In response, the RRC directs the MAC in DU 431 to schedule UE 401 in the selected resource blocks. The MAC schedules UE 401 in the selected resource blocks and notifies UE 401 over RU 411 of the scheduling. UE 401 exchanges user signaling and with the RRC in CU 441 over RU 411 and DU 431 using the scheduled resource blocks. UE 401 exchanges user data with the SDAP in CU 441 over RU 411 and DU 431 using the scheduled resource blocks. The RRC exchanges the user signaling with AMF 421. The SDAP exchanges the user data with UPF 423 and SMF 422.

Due to UE mobility or some other triggering event, UE 401 hands over to RU 413. The RRC in CU 441 controls DU 432 and RU 414 to serve UE 401 over a frequency channel in F2. The RRC implements a data structure and determines that multiple PCIs are available for UE 401 based on the attachment signaling. The RRC implements a data structure and determines excessive load on the frequency channel. For example, the RRC in CU 441 may determine that the amount of RRC connected users on the frequency channel and/or the percent occupancy on the frequency channel exceeds a threshold value to identify excessive channel load. In response to the multiple available PCIs and the excessive load, the RRC selects a set of resource blocks in the new frequency channel and generates measurement instructions for UE 401. The measurement instructions direct UE 401 to measure RSRP and RSSI of a frequency range that comprises the selected resource blocks and to inhibit measuring signal metrics for resource blocks outside of the frequency range. The RRC 441 transfers the UE instructions to UE 401 over DU 432 and RU 413.

RU 413 receives a measurement report from UE 401 transfers the measurement report to the RRC in CU 441 over DU 432. The measurement report indicates the RSSI and RSRP for the selected resource blocks. The RRC determines the RSSI and RSRP for the selected resource blocks exceed a quality threshold. The RRC in CU 441 directs the MAC in DU 432 to schedule UE 401 in the selected resource blocks. The MAC schedules UE 401 in the selected resource blocks and notifies UE 401 over RU 413 of the scheduling. UE 401 exchanges user signaling and with the RRC in CU 441 over RU 413 and DU 432 using the scheduled resource blocks. UE 401 exchanges user data with the SDAP in CU 441 over RU 413 and DU 432 using the scheduled resource blocks. The RRC exchanges the user signaling with AMF 421 and the SDAP exchanges the user data with UPF 423 and SMF 422.

Figure 6:
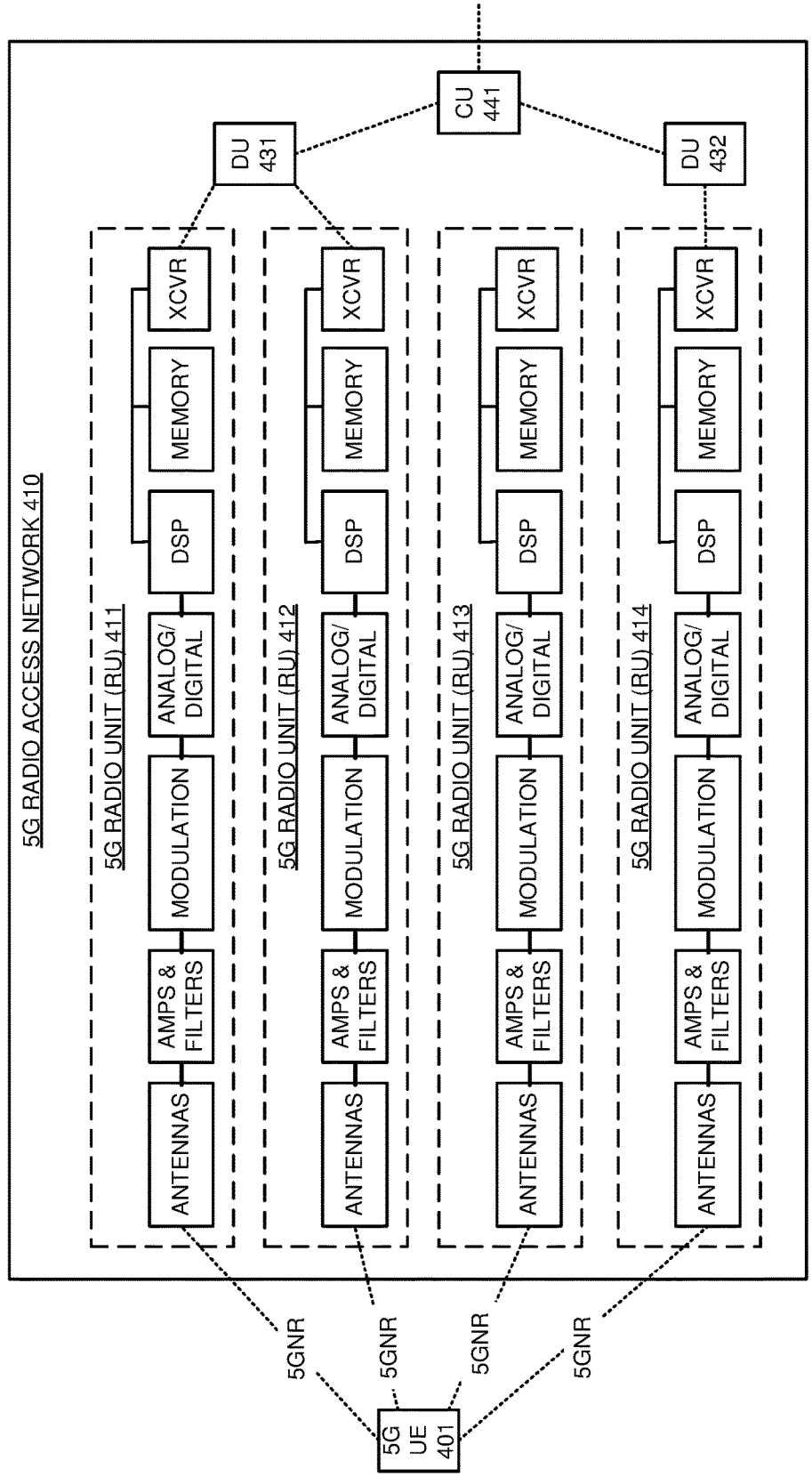
FIG. 6 illustrates 5G Radio Units (RUs) that serve the 5G UE to determine a radio metric for selected resource blocks.

FIG. 6 illustrates 5G Radio Units (RUs) 411-414 that serve 5G UE 401 to determine a radio metric for selected resource blocks. RUs 411-414 comprise an example of radios 121-122, although radios 121-122 may differ. RUs 411-414 comprise antennas, amplifiers, filters, modulation, analog-to-digital interfaces, DSP, memory, and transceivers (XCVRs) that are coupled over bus circuitry. UE 401 is wirelessly coupled to the antennas in RUs 411-414 over 5GNR links using respective frequency bands F1-F2. RUs 411-412 use F1 and RUs 413-414 use F2. Transceivers in RUs 411-414 are coupled to transceivers in DUs 431-432 over fronthaul links like enhanced Common Public Radio Interface (eCPRI). The DSP in RUs 411-414 execute their operating systems and radio applications to exchange 5GNR signals with UE 401 and to exchange 5GNR data units with DUs 431-432.

For the uplink, the antennas receive wireless signals from UE 401 transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies (F1-F2). The analog/digital interfaces convert the demodulated analog signals into digital signals for the DSP. The DSP transfers corresponding 5GNR symbols to DUs 431-432 over the transceivers.

For the downlink, the DSP receives downlink 5GNR symbols from DUs 431-432. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies F1-F2. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data.

Figure 7:
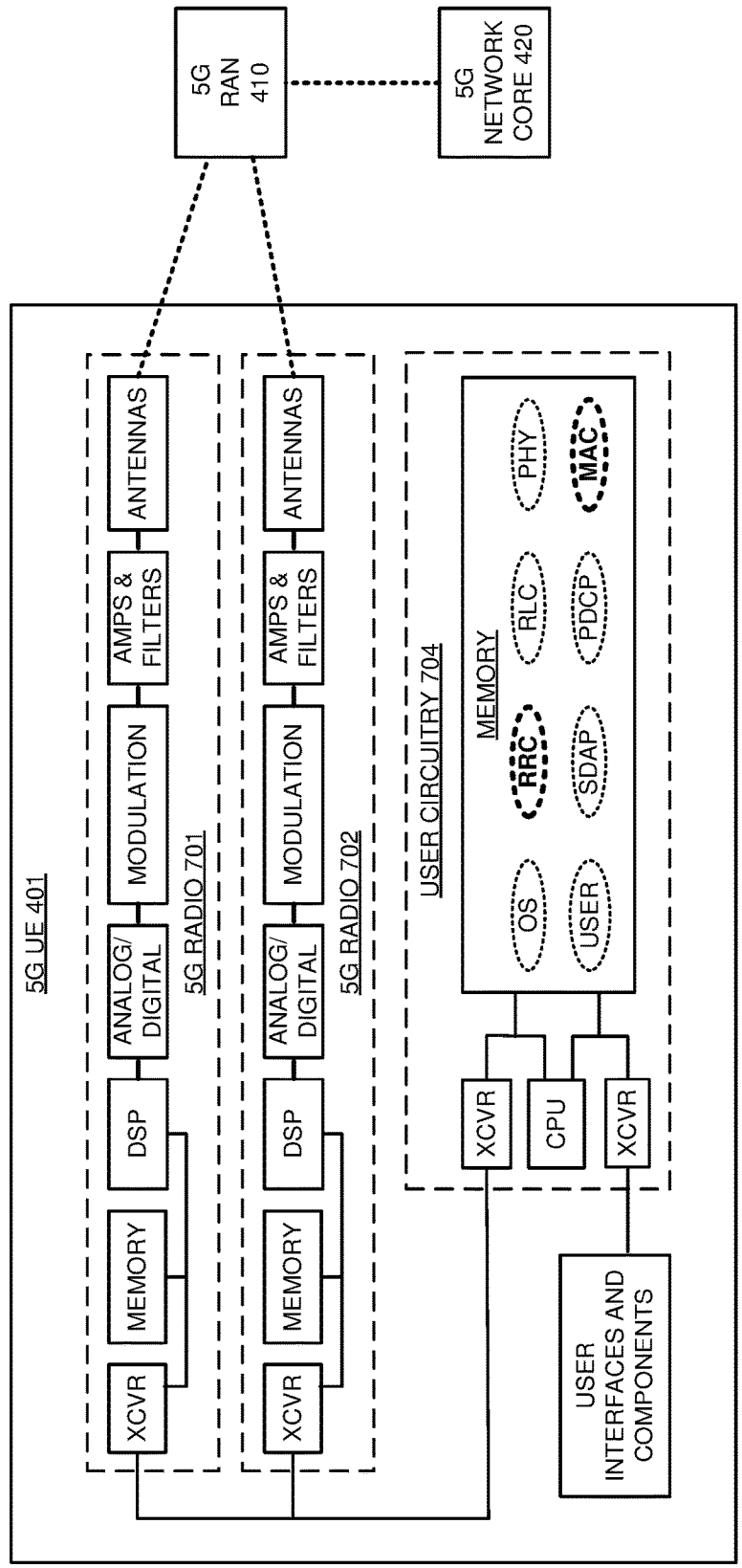
FIG. 7 illustrates the 5G UE that determines a radio metric for selected resource blocks.

FIG. 7 illustrates 5G UE 401 that measures radio metrics for selected resource blocks. UE 401 comprises an example of UE 101, although UE 101 may differ. UE 401 comprises 5GNR radios 701-702 and user circuitry 703. 5GNR radios 701-702 comprise antennas, amplifiers, filters, modulation, analog-to-digital interfaces, DSP, memory, and transceivers that are coupled over bus circuitry. User circuitry 703 comprises memory, CPU, user interfaces and components, and transceivers that are coupled over bus circuitry. The memory in user circuitry 704 stores an operating system, user applications (USER), and 5GNR network applications for PHY, MAC, RLC, PDCP, SDAP, and RRC. The antennas in 5GNR radios 701-702 are wirelessly coupled to 5G RAN 510 over frequency bands F1-F2. Transceivers in 5GNR radios 701-702 are coupled to a transceiver in user circuitry 703. A transceiver in user circuitry 703 is typically coupled to the user interfaces and components like displays, controllers, and memory. The CPU in user circuitry 703 executes the operating system, PHY, MAC, RLC, PDCP, SDAP, and RRC to exchange 5GNR signaling and data with 5G RAN 410 over 5GNR radios 701-702.

In 5GNR radios 701-702, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency (F1-F2). The analog/digital interfaces convert the demodulated analog signals into digital signals for the DSPs. The DSPs transfer corresponding 5GNR symbols to user circuitry 704 over the transceivers. In user circuitry 703, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the low-latency user applications. The 5GNR network applications process the new uplink 5GNR signaling and low-latency user data to generate corresponding uplink 5GNR symbols that carry the uplink 5GNR signaling and data. In 5GNR radios 701-702, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency (F1-F2). The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

The RRC in UE 401 wirelessly attaches to the RRC in CU 441 on a frequency channel in F1 over 5G radio 701 and indicates the PCIs available for UE 401. 5G radio 701 receives 5GNR signaling that comprises UE instructions from RU 411. 5G radio 701 transfers the UE instructions to the RRC in UE 401. The UE instructions direct UE 401 to measure RSRQ (or some other radio metric) over a frequency range indicated by a measurement start, and measurement stop frequency. The frequency range comprises selected resource blocks in the frequency channel. The RRC directs the PHY in UE 401 to measure RSRP and RSSI for the frequency range. The PHY measures the RSSI and RSRP over the frequency range indicated by the UE instructions and transfers the measurements to the RRC. The PHY avoids measuring signal metrics for frequencies outside of the specified frequency range. The RRC determines RSRQ for the frequency range based on the measured RSSI and RSRP. Depending on the RRC connection state of UE 401, the measured RSRQ may comprise Synchronization Signal RSRQ (SS-RSRQ) or Channel State Information RSRQ (CSI-RSRQ).

The RRC generates a measurement report that indicates the measured RSRQ for only the selected resource blocks. The RRC in UE 401 transfers the measurement report to the RRC in CU 441 over 5G radio 701. 5G radio 701 receives 5GNR signaling that indicates resource block scheduling. 5G radio 701 transfers the resource block scheduling to the RRC in UE 401. The RRC directs the MAC in UE 410 to schedule UE 410 for data services according to the received scheduling. The MAC schedules UE 401 to transmit and receive signaling in the scheduled resource blocks. The RRC in UE 401 exchanges user signaling with the RRC in CU 441 in the scheduled resource blocks. The SDAP in UE 401 exchanges user data with the SDAP in CU 441 in the scheduled resource blocks.

Figure 8:
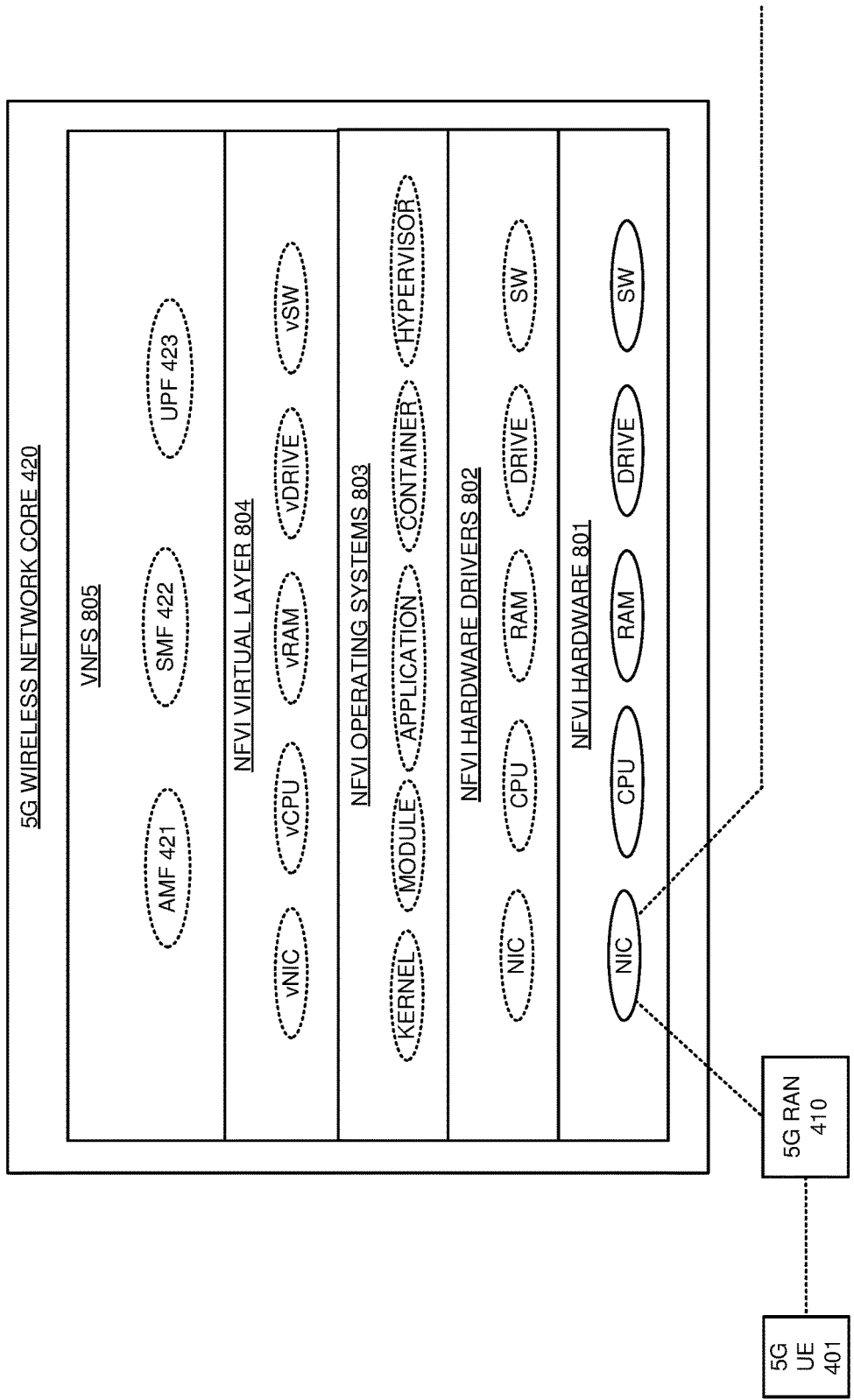
FIG. 8 illustrates a 5G wireless network core that serves the 5G UE that determines a radio metric for selected resource blocks

FIG. 8 illustrates 5G wireless network core 420 that serves 5G UE 401 to determine radio metrics for selected resource blocks. Wireless network core 420 comprises an example of network elements 140, although network elements 140 may differ. Wireless network core 420 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise AMF 421, SMF 422, and UPF 423. Other VNFs like Network Slice Selection Function (NSSF), Authentication Server Function (AUSF), Unified Data Manager (UDM), Network Exposure Function (NEF), Policy Control Function (PCF) are typically present but are omitted for clarity. Wireless network core 420 may be located at a single site or be distributed across multiple geographic locations. The NIC are coupled to CU 441 in 5G RAN 410 and to external systems. NFVI hardware 801 executes NFVI hardware drivers 802, NFVI operating systems 803, NFVI virtual layer 804, and NFVI VNFs 805 to serve UE 401 over 5G RAN 410.

AMF 421 performs N2/N1 termination, N1 ciphering & integrity protection, LIE registration, SMF/PCF selection. UE connection/mobility management. UE authentication and authorization, UE security management, and tracking area updates. SMF 422 performs session establishment/management, network address allocation, N1 termination, downlink data notification, and traffic steering and routing. UPF 423 performs packet routing & forwarding, packet inspection, QoS handling, PDU interconnection, and mobility anchoring. Although not shown for clarity, a Network Slice Selection Function (NSSF) performs slice discovery, AMF discovery, slice authorization, and slice prioritization. An Authentication Server Function (AUSF) performs UE authentication with Authentication and Key Agreement (AKA) credentials and handles UE authorizations. A User Data Management (UDM) handles UE context, LIE subscription data, and UE authentication keys. A Network Repository Function (NRF) performs network function authentication and authorization, selection, security, and event registration/subscriptions. A Policy Control Function (PCF) distributes LIE policies to the control plane.

Figure 9:
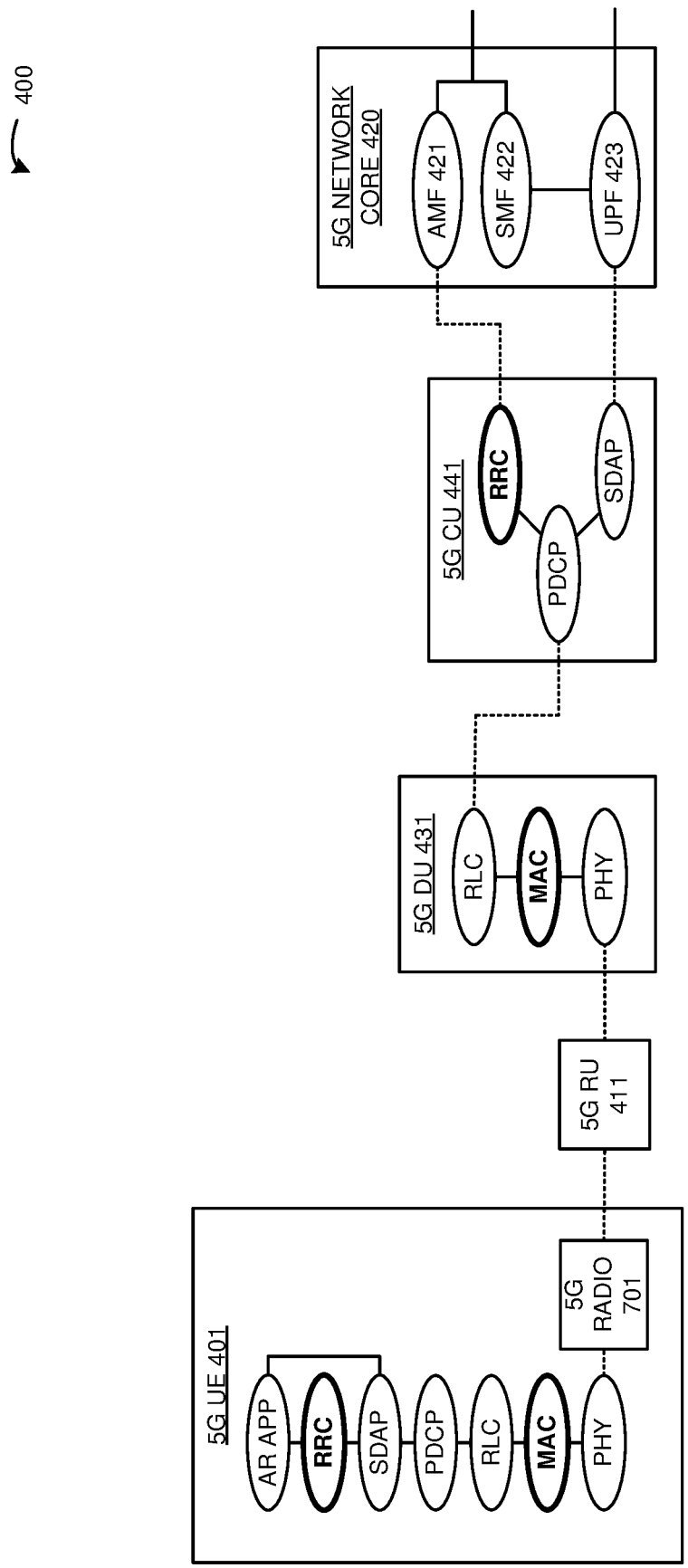
FIG. 9 illustrates the operation of the 5G communication network and the 5G UE to determine a radio metric for selected resource blocks.

FIG. 9 illustrates the operation of 5G communication network 400 and 5G UE 401 to determine signal metrics for selected resource blocks. The operation is exemplary and may vary in other examples. In response to a user application, the RRC in UE 401 wirelessly attaches to the RRC in CU 441 over the PDCPs, RLCs, MACs, and PHYs. During the attachment signaling, the RRC in UE 401 indicates a set of available PCIs for UE 401 to the RRC in CU 441. The RRC in CU 441 request wireless data service for UE 401 from AMF 421. AMF 421 interacts with other network functions to authorize UE 401 for wireless data services. Responsive to the authorization, AMF 421 transfers network addresses and quality-of-service metrics for UE 401 to the RRC in CU 441. The RRC in CU 441 transfers the network addressing and quality of-service-metrics to the RRC in UE 401 over the PDCPs, RLCs, MACs, and PHYs. The RRC in UE 401 exchanges user data with the RRC in CU 441 over the SDAP, PDCPs, RLCs, MACs, and PHYs. The SDAP in UE 401 exchanges user data with the SDAP in CU 441 over the PDCPs, RLCs, MACs, and PHYs. The RRC in CU 441 exchanges the user signaling with AMF 421. The SDAP in CU 441 exchanges the user data with UPF 423 and SMF 422.

The RRC in CU 401 hosts a data structure to determine that multiple PCIs are available for UE 401 based on the attachment signaling. The RRC in CU 441 selects a set of resource blocks in the frequency channel and generates measurement instructions for UE 401. The measurement instructions direct UE 411 to measure RSRQ for a frequency range that comprises the selected resource blocks and to inhibit measuring signal metrics for resource blocks outside of the frequency range. The RRC in CU 441 transfers the UE instructions to the RRC in UE 401 over the SDAPs, PDCPs, RLCs, MACs, and PHYs.

The RRC in UE 401 receives the UE instructions. The RRC in UE 401 directs the PHY in UE 401 to measure RSSI and RSRP over the frequency range specified by the UE instructions. The PHY in UE 401 measures RSSI and RSRP over the specified frequency range. The PHY in UE 401 avoids measuring radio signal metrics for frequencies outside of the specified frequency range. The PHY in UE 101 transfers the measured RSRP and RSSI to the RRC in UE 401. The RRC in UE 401 determines the RSRQ for the specified frequency range based on the RSRP and RSSI. The RRC in UE 401 generates a measurement report that indicates the RSRQ for the specified frequency range and does not indicate signal metrics for frequencies outside of the frequency range. The RRC in UE 401 transfers the measurement report to the RRC in CU 441 over the SDAPs, PDCPs, RLCs, MACs, and PHYs.

The RRC in CU 441 determines the RSRQ for the selected resource blocks is above a quality threshold. The RRC in CU 441 directs MAC in DU 431 to schedule UE 401 in the selected resource blocks. The MAC in DU 431 schedules UE 401 for wireless data services in the selected resource blocks. The MAC in DU 431 notifies the MAC in UE 401 of the scheduling over the PHYs. The MAC in UE 401 receives the scheduling and schedules UE 401 for wireless data services in the scheduled resource blocks. The RRC in UE 401 exchanges user signaling in the scheduled resource blocks with the RRC in CU 441 over the SDAPs, PDCPs, RLCs, MACs, and PHYs. The SDAP in UE 401 exchanges user data in the selected resource blocks with the SDAP in UE 401 over the PDCPs, RLCs, MACs, and PHYs. The RRC in CU 441 exchanges the user signaling with AMF 421. The SDAP in CU 441 exchanges the user data with UPF 423 and SMF 422.

The wireless data network circuitry described above comprises computer hardware and software that form special-purpose UE circuitry to determine radio metrics for selected resource blocks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose UE circuitry to determine radio metrics for selected resource blocks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method for operating a Radio Access Network (RAN) to wirelessly serve a User Equipment (UE) over a frequency channel based on a radio signal metric, the method comprising:
    baseband circuitry determining when multiple Physical Cell Identifiers (PCIs) are available to serve the UE, and in response, selecting some resource blocks in the frequency channel and generating a UE instruction to measure the radio signal metric for the selected resource blocks in the frequency channel and to inhibit measuring the radio signal metric for other resource blocks in the frequency channel;
    a radio receiving the UE instruction from the baseband circuitry, wirelessly transferring the UE instruction to the UE, wirelessly receiving a measurement report from the UE that indicates the radio signal metric for the selected resource blocks, and transferring the measurement report to the baseband circuitry; and
    the baseband circuitry executing a 5GNR Media Access Control (MAC) and a 5GNR Radio Resource Control (RRC), the 5GNR RRC receiving the measurement report, and the 5GNR MAC responsively scheduling the UE in the selected resource blocks based on the radio signal metric for the selected resource blocks.

2. The method of claim 1 wherein the signal metric comprises Received Signal Received Quality (RSRQ), Synchronization Signal RSRQ (SS-RSRQ), Channel State Information RSRQ (CSI-RSRQ), Received Signal Received Power (RSRP), Received Signal Strength Indication (RSSI), and/or Signal to Interference plus Noise Ratio (SINR).

3. The method of claim 1 further comprising the baseband circuitry determining when channel bandwidth is excessive and when multiple PCIs are available to serve the UE, and in response, selecting some of the resource blocks in the frequency channel and generating a UE instruction to measure the radio signal metric for the selected resource blocks in the frequency channel and to inhibit measuring the radio signal metric for other resource blocks in the frequency channel.

4. The method of claim 1 wherein baseband circuitry determining when the multiple PCIs are available to serve the UE, and in response, selecting some of the resource blocks in the frequency channel and generating the UE instruction to measure the radio signal metric for the selected resource blocks in the frequency channel and to inhibit measuring the radio signal metric for other resource blocks in the frequency channel comprises the 5GNR RRC determining when the multiple PCIs are available to serve the UE, and in response, selecting some of the resource blocks in the frequency channel and generating the UE instruction to measure the radio signal metric for the selected resource blocks in the frequency channel and to inhibit measuring the radio signal metric for other resource blocks in the frequency channel.

5. The method of claim 1 wherein the baseband circuitry receiving the measurement report and responsively scheduling the UE in the selected resource blocks based on the radio signal metric for the selected resource blocks comprises the baseband circuitry determining when the signal metric exceeds a quality threshold and responsively scheduling the UE in the selected resource blocks based on the signal metric for the selected resource blocks when the radio signal metric exceeds the quality threshold.

6. The method of claim 1 further comprising the baseband circuitry determining when channel load is excessive and when multiple PCIs are available to serve the UE, and in response, selecting some resource blocks in the frequency channel and generating a UE instruction to measure the radio signal metric for the selected resource blocks in the frequency channel and to inhibit measuring the radio signal metric for other resource blocks in the frequency channel.

7. The method of claim 1 wherein the multiple PCIs comprises three or more PCIs.

8. The method of claim 1 further comprising:
    the baseband circuitry verifying the radio signal metric is for the selected resource blocks; and
    when the baseband circuitry cannot verify the radio signal metric is for the selected resource blocks, the baseband circuitry generating new UE instructions to measure the radio signal metric for the selected resource blocks and transferring the new UE instruction to the UE over the radio.

9. The method of claim 1 wherein:
    the baseband circuitry comprises a 5GNR Centralized Unit (CU) circuitry and a 5GNR Distributed Unit (DU) circuitry; and
    the radio comprises a 5GNR Receiving Unit (RU).

10. The method of claim 1 wherein the RAN comprises a 5GNR gNodeB.

11. A Radio Access Network (RAN) configured to wirelessly serve a User Equipment (UE) over a frequency channel based on a radio signal metric, the RAN comprising:
    baseband circuitry configured to determine when multiple Physical Cell Identifiers (PCIs) are available to serve the UE, and in response, select some resource blocks in the frequency channel and generate a UE instruction to measure the radio signal metric for the selected resource blocks in the frequency channel and to inhibit measuring the radio signal metric for other resource blocks in the frequency channel;
    a radio configured to receive the UE instruction from the baseband circuitry, wirelessly transfer the UE instruction to the UE, wirelessly receive a measurement report from the UE that indicates the radio signal metric for the selected resource blocks, and transfer the measurement report to the baseband circuitry; and
    the baseband circuitry configured to execute a Fifth Generation New Radio (5GNR) Media Access Control (MAC) and a 5GNR Radio Resource Control (RRC), the 5GNR RRC configured to receive the measurement report and the 5GNR MAC configured to responsively schedule the UE in the selected resource blocks based on the radio signal metric for the selected resource blocks.

12. The RAN claim 11 wherein the signal metric comprises Received Signal Received Quality (RSRQ), Synchronization Signal RSRQ (SS-RSRQ), Channel State Information RSRQ (CSI-RSRQ), Received Signal Received Power (RSRP), Received Signal Strength Indication (RSSI), and/or Signal to Interference plus Noise Ratio (SINR).

13. The RAN of claim 11 further comprising the baseband circuitry configured to determine when channel bandwidth is excessive and when multiple PCIs are available to serve the UE, and in response, select some of the resource blocks in the frequency channel and generate a UE instruction to measure the radio signal metric for the selected resource blocks in the frequency channel and to inhibit measuring the radio signal metric for other resource blocks in the frequency channel.

14. The RAN of claim 11 wherein the 5GNR RRC is configured to determine when the multiple PCIs are available to serve the UE, and in response, select some of the resource blocks in the frequency channel and generate the UE instruction to measure the radio signal metric for the selected resource blocks in the frequency channel and to inhibit measuring the radio signal metric for other resource blocks in the frequency channel.

15. The RAN of claim 11 wherein the baseband circuitry is configured to determine when the signal metric exceeds a quality threshold and responsively schedule the UE in the selected resource blocks based on the signal metric for the selected resource blocks when the radio signal metric exceeds the quality threshold.

16. The RAN of claim 11 further comprising the baseband circuitry configured to determine when channel load is excessive and when multiple PCIs are available to serve the UE, and in response, select some of the resource blocks in the frequency channel and generate a UE instruction to measure the radio signal metric for the selected resource blocks in the frequency channel and to inhibit measuring the radio signal metric for other resource blocks in the frequency channel.

17. The RAN of claim 11 wherein the multiple PCIs comprises three or more PCIs.

18. The RAN of claim 11 further comprising:
the baseband circuitry configured to verify the radio signal metric is for the selected resource blocks; and
when the baseband circuitry cannot verify the radio signal metric is for the selected resource blocks, the baseband circuitry configured to generate new UE instructions to measure the radio signal metric for the selected resource blocks and transfer the new UE instruction to the UE over the radio.

19. The RAN of claim 11 wherein:
the baseband circuitry comprises a 5GNR Centralized Unit (CU) circuitry and a 5GNR Distributed Unit (DU) circuitry; and
the radio comprises a 5GNR Receiving Unit (RU).

20. The RAN of claim 11 wherein the RAN comprises a 5GNR gNodeB.

* * * * *